United States Patent [19]
Kikis

[11] Patent Number: 5,898,160
[45] Date of Patent: Apr. 27, 1999

[54] SYSTEM FOR REMINDING A USER TO REMOVE A CREDIT CARD FROM A CREDIT CARD MACHINE

[76] Inventor: Chris T. Kikis, 709 Lighthouse Dr., Tarpon Springs, Fla. 34689

[21] Appl. No.: 08/896,789

[22] Filed: Jul. 18, 1997

[51] Int. Cl.⁶ .................................................. G06K 7/04

[52] U.S. Cl. .......................................... 235/448; 235/475

[58] Field of Search .................................. 235/448, 475, 235/380

[56] References Cited

U.S. PATENT DOCUMENTS 5,432,327  7/1995  Price .

*Primary Examiner*—Harold Pitts
*Attorney, Agent, or Firm*—Louis J. Brunoforte

[57] ABSTRACT

A system for reminding a user to remove a credit card from a credit card machine is provided. Such system includes a credit card machine for recording information stored on a credit card. Further provided is a mechanism for producing sound upon the actuation thereof. Finally, a trigger assembly is connected to the credit card machine for actuating the mechanism for producing sound when the information of the credit card is read.

19 Claims, 5 Drawing Sheets

5,898,160

SYSTEM FOR REMINDING A USER TO REMOVE A CREDIT CARD FROM A CREDIT CARD MACHINE

BACKGROUND OF THE INVENTION

1. Related Disclosure Document

This invention set forth in this application was first disclosed to the United States Patent Office Jan. 13, 1997 by way of a disclosure document under the title CARDMINDER and assigned number 411022. The present invention was further disclosed to the United States Patent Office Feb. 10, 1997 by way of a disclosure document under the title EASYPICK and assigned number 415414.

2. Field of the Invention

The present invention relates to a system for reminding a user to remove a credit card from a credit card machine and more particularly pertains to producing an audible sound while a credit card is situated within a credit card machine and further facilitating the removal thereof.

3. Description of the Prior Art

The use of credit card machines is known in the prior art. More specifically, credit card machines heretofore devised and utilized for the purpose of manually registering credit cards are known to consist basically of familiar, expected and obvious structural configurations, notwithstanding the myriad of designs encompassed by the crowded prior art which have been developed for the fulfillment of countless objectives and requirements.

In this respect, the system for reminding a user to remove a credit card from a credit card machine according to the present invention substantially departs from the conventional concepts and designs of the prior art, and in so doing provides an apparatus primarily developed for the purpose of producing an audible sound while a credit card is situated within a credit card machine and further facilitating the removal thereof.

Therefore, it can be appreciated that there exists a continuing need for a new and improved system for reminding a user to remove a credit card from a credit card machine which can be used for producing an audible sound while a credit card is situated within a credit card machine and further facilitating the removal thereof. In this regard, the present invention substantially fulfills this need.

SUMMARY OF THE INVENTION

In view of the foregoing disadvantages inherent in the known types of credit card machines now present in the prior art, the present invention provides an improved system for reminding a user to remove a credit card from a credit card machine. As such, the general purpose of the present invention, which will be described subsequently in greater detail, is to provide a new and improved system for reminding a user to remove a credit card from a credit card machine which has all the advantages of the prior art and none of the disadvantages.

To attain this, the present invention essentially comprises a manually operated credit card machine including a generally planar base plate with a rectangular configuration. As shown in FIG. 1, the credit card machine has a top surface, a bottom surface, and a periphery defined by a pair of long side edges and a pair of short end edges. The bottom surface of the base plate has a pair of rectangular blocks integrally coupled thereto along the end edges. Such blocks serve to elevate the base plate from a supporting surface. As best shown in FIG. 3, the top surface of the base plate has a credit card mounting assembly including an elongated thin strip portion positioned along one of the side edges of the base plate. A pair of square portions are situated at ends of the strip portion. It should be noted that the strip portion and the square portions of the mounting assembly are constructed with a predetermined height. By this structure, the mounting assembly defines a rectangular groove sized to preclude movement of a credit card when situated therein. The base plate further includes a rectangular member with the predetermined height coupled to the top surface of the base plate. Preferably, a top long side edge of the rectangular member is spaced from and parallel with the strip portion of the mounting assembly. Next provided is a sliding assembly including an upper bar having a top face, a bottom face and a periphery formed therebetween. The top face has a frusto-pyramidal configuration, as shown in FIGS. 1 and 2. The sliding assembly further includes a pair of planar side faces coupled along an upper edge thereof to the bottom face of the upper bar and extended downwardly therefrom. The side faces are slidably coupled to the long edges of the base plate of the credit card machine. In use, the upper bar remains perpendicular with respect to the long edges and is further adapted to be manually translated between the end edges of the base plate. As such, upon the placement of a credit card within the rectangular groove and a credit card register form on the top surface of the base plate, the sliding assembly may be slid from a first end edge of the base plate to a second end edge thereof. Such sliding effects the imprinting of information embossed on the credit card on the credit card register form. As shown in FIGS. 1–4, a triangular opening is formed in the base plate. The triangular opening has a first linear edge parallel with and spaced in relation to the strip portion of the credit card mounting assembly. Associated therewith is a second linear edge defining a right angle with the first linear edge and parallel with and spaced in relation to an edge of one of the square portions of the credit card mounting assembly. Finally, a third linear edge is formed between ends of the first and second linear edges. During use, the credit card may be removed by the depression of a corner thereof which resides over the opening. With reference now to FIG. 4, it can be seen that a piezoelectric sound emitting means is mounted on the bottom surface of the base plate of the credit card machine. Such sound emitting means is adapted for audibly emitting audio signals upon the receipt thereof. Connected to the piezoelectric sound emitting means is audio signal producing means. The audio signal producing means is adapted for continuously producing audio signals and transmitting the same to the piezoelectric sound emitting means only during the receipt of power. A switch means is connected between the audio signal producing means and a watch battery for providing power to the audio signal producing means upon the closing thereof. With continuing reference to FIG. 4, a trigger assembly is provided for closing the switch means only when the credit card is situated within the rectangular groove of the credit card mounting assembly. The trigger assembly includes a slider with a h-shaped configuration defined by a linear long extent, a linear short extent, and an intermediate extent. Such intermediate extent is integrally coupled between a first end of the short linear extent and a central portion of the long linear extent. It should be noted that the long, short and intermediate extents reside in a common plane. For maintaining the slider in slidable abutment with the bottom surface of the base plate, the trigger assembly further includes a plurality of U-shaped sliding brackets mounted on the bottom surface of the base plate. Such U-shaped brackets slidably receive the short linear extent and the long linear extent. As shown in FIG. 4, the intermediate extent has a tab integrally coupled to a top surface thereof. This tab is extended upwardly from the slider through a square aperture formed in the base plate between a central extent of the strip portion of the mounting assembly and the rectangular member of the base plate of the credit card machine. The trigger assembly further includes a pair of springs. Such springs include a first spring coupled between a second end of the linear short extent and the bottom surface of the base plate. A second spring is connected between a first end of the linear long extent and the bottom surface of the base plate. The slider thus is adapted to slide between an unbiased first orientation wherein the tab abuts a first side edge of the square aperture and a second end of the long linear extent of the slider is situated distant the switch means. The slider is further adapted to slide to a biased second orientation wherein the tab abuts a second side edge of the aperture and the second end of the long linear extent of the slider abuts the switch means thereby closing the same. It should be understood that upon the placement of the credit card within the rectangular groove of the credit card mounting assembly, a bottom edge thereof abuts the tab of the trigger assembly thereby transferring the tab to the second orientation thereof. In the second orientation, the present invention thus effects the emission of audio signals from the piezoelectric sound emitting means for reminding a user to remove the credit card.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for reminding a user to remove a credit card from a credit card machine which has all the advantages of the prior art credit card machines and none of the disadvantages.

It is another object of the present invention to provide a new and improved system for reminding a user to remove a credit card from a credit card machine which may be easily and efficiently manufactured and marketed.

It is a further object of the present invention to provide a new and improved system for reminding a user to remove a credit card from a credit card machine which is of a durable and reliable construction.

An even further object of the present invention is to provide a new and improved system for reminding a user to remove a credit card from a credit card machine which is susceptible of a low cost of manufacture with regard to both materials and labor, and which accordingly is then susceptible of low prices of sale to the consuming public, thereby making such system for reminding a user to remove a credit card from a credit card machine economically available to the buying public.

Still yet another object of the present invention is to provide a new and improved system for reminding a user to remove a credit card from a credit card machine which provides in the apparatuses and methods of the prior art some of the advantages thereof, while simultaneously overcoming some of the disadvantages normally associated therewith.

Still another object of the present invention is to produce an audible sound while a credit card is situated within a credit card machine and further facilitate the removal thereof.

Lastly, it is an object of the present invention to provide a system for reminding a user to remove a credit card from a credit card machine. Such system includes a credit card machine for recording information stored on a credit card. Further provided is a mechanism for producing sound upon the actuation thereof. Finally, a trigger assembly is connected to the credit card machine for actuating the mechanism for producing sound when the information of the credit card is read.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
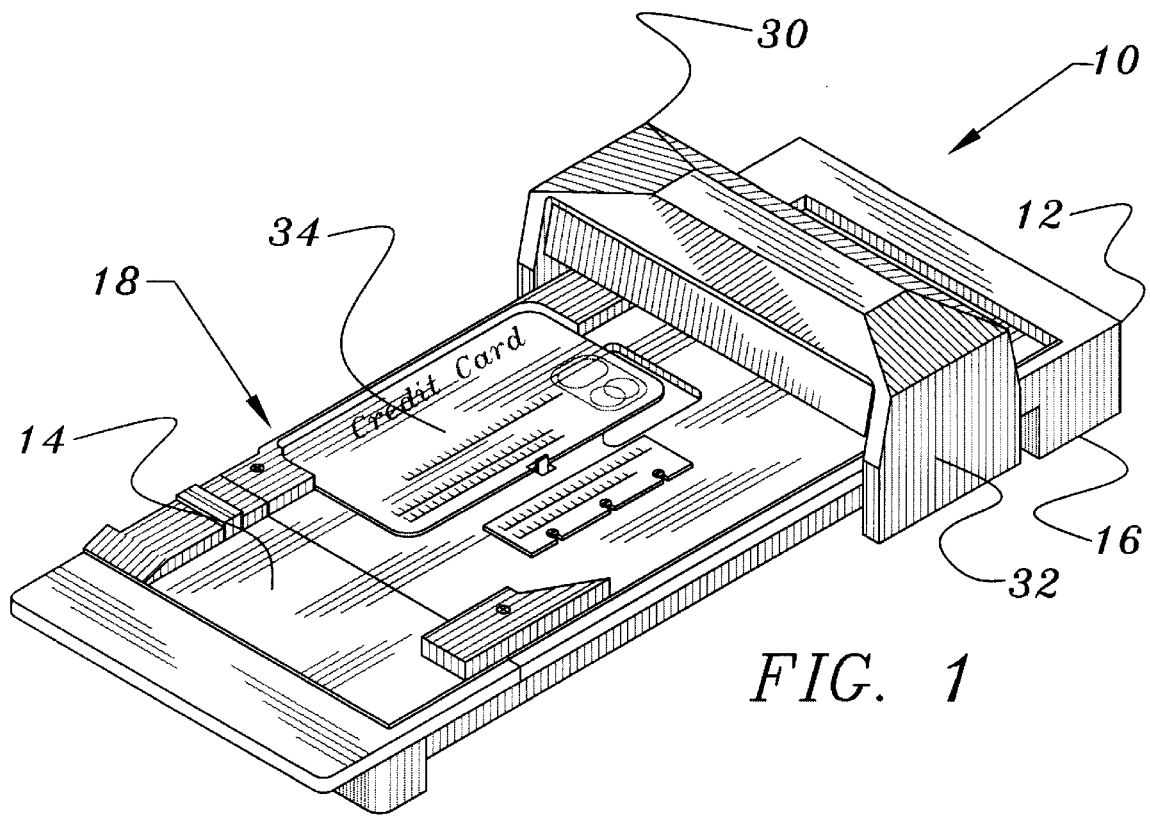
FIG. 1 is a perspective illustration of the preferred embodiment of the system for reminding a user to remove a credit card from a credit card machine constructed in accordance with the principles of the present invention.

With reference now to the drawings, and in particular to FIG. 1 thereof, a new and improved system for reminding a user to remove a credit card from a credit card machine embodying the principles and concepts of the present invention and generally designated by the reference numeral 10 will be described.

The present invention, the new and improved system for reminding a user to remove a credit card from a credit card machine, is comprised of a plurality of components. Such components in their broadest context include a credit card machine, an opening, means for producing sound, and a trigger assembly. Such components are individually configured and correlated with respect to each other so as to attain the desired objective.

More specifically, it will be noted that the system 10 of the present invention includes a manually operated credit card machine 12 including a generally planar base plate 14 with a rectangular configuration. Credit card machines are also commonly referred to as credit card imprinter machines. As shown in FIG. 1, the credit card machine has a top surface, a bottom surface, and a periphery defined by a pair of long side edges and a pair of short end edges. The bottom surface of the base plate has a pair of rectangular blocks 16 integrally coupled thereto along the end edges. Such blocks serve to elevate the base plate from a supporting surface.

Figure 3:
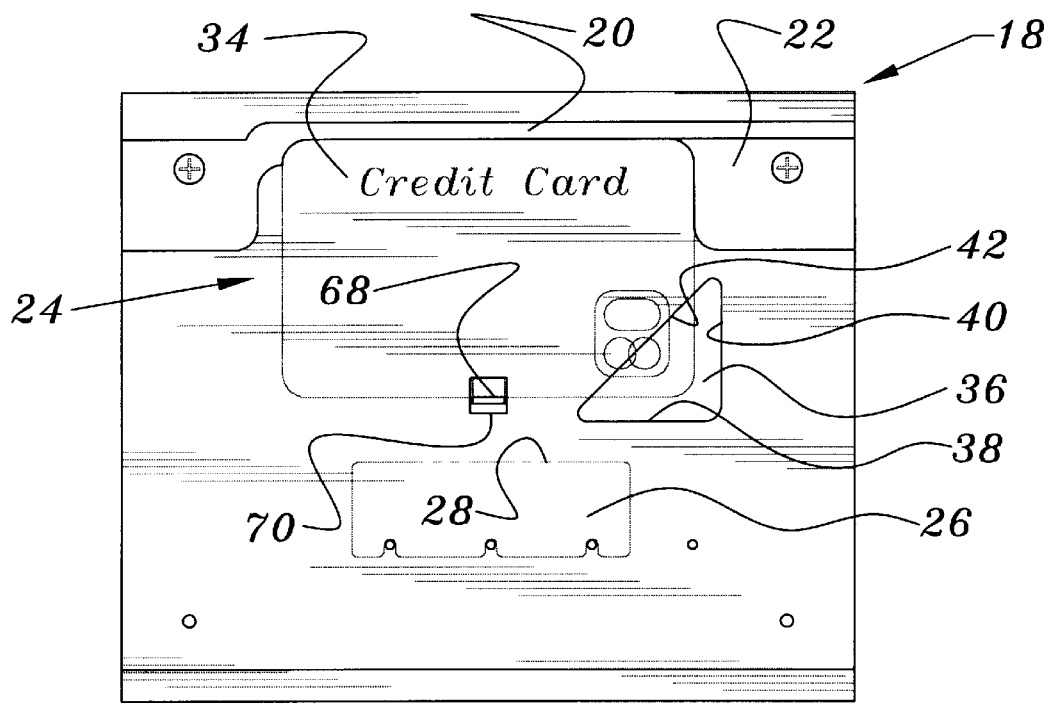
FIG. 3 is a top view of the present invention.

As best shown in FIG. 3, the top surface of the base plate has a credit card mounting assembly 18 including an elongated thin strip portion 20 positioned along one of the side edges of the base plate. A pair of square portions 22 are situated at ends of the strip portion. It should be noted that the strip portion and the square portions of the mounting assembly are constructed with a predetermined height. By this structure, the mounting assembly defines a rectangular groove 24 sized to preclude movement of a credit card when situated therein. The base plate further includes a rectangular member 26 with the predetermined height coupled to the top surface of the base plate. Preferably, a top long side edge 28 of the rectangular member is spaced from and parallel with the strip portion of the mounting assembly.

Figure 2:
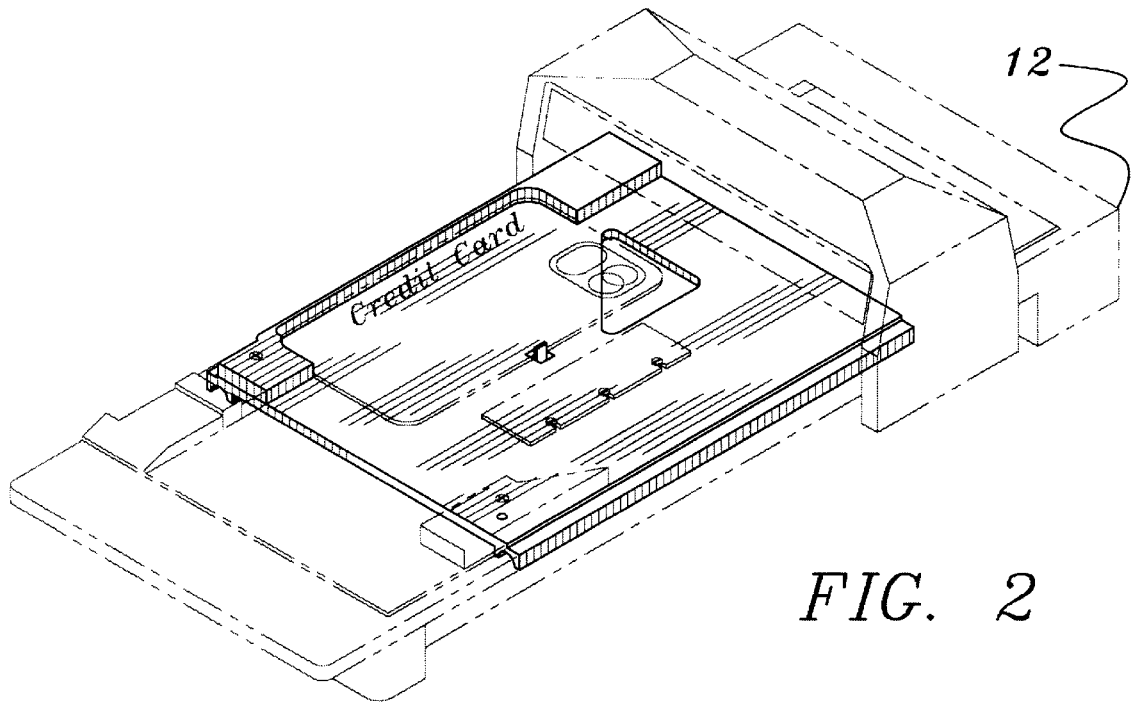
FIG. 2 is a perspective view of a retrofitted version of the present invention.

Next provided is a sliding assembly including an upper bar 30 having a top face, a bottom face and a periphery formed therebetween. The top face has a frusto-pyramidal configuration, as shown in FIGS. 1 and 2. The sliding assembly further includes a pair of planar side faces 32 coupled along an upper edge thereof to the bottom face of the upper bar and extended downwardly therefrom. The side faces are slidably coupled to the long edges of the base plate of the credit card machine.

In use, the upper bar remains perpendicular with respect to the long edges of the credit card machine and is further adapted to be manually translated between the end edges of the base plate. As such, upon the placement of a credit card 34 within the rectangular groove and a credit card register form on the top surface of the base plate, the sliding assembly may be slid from a first end edge of the base plate to a second end edge thereof. Such sliding effects the imprinting of information embossed on the credit card on the credit card register form. During the sliding of the sliding assembly, the rectangular member functions to support the register form. Conventional unillustrated rollers may be situated beneath the sliding assembly to apply a pressure to the top surface of the base plate. The present invention may also be utilized with arm operated, standing credit card imprinter machines.

As shown in FIGS. 1–4, a triangular opening 36 is formed in the base plate. The triangular opening has a first linear edge 38 parallel with and spaced in relation to the strip portion of the credit card mounting assembly. Associated therewith is a second linear edge 40 defining a right angle with the first linear edge and parallel with and spaced in relation to an edge of an adjacent one of the square portions of the credit card mounting assembly. Finally, a third linear edge 42 is formed between ends of the first and second linear edges. During use, the credit card may be removed by the depression of a corner thereof which resides over the opening.

Figure 6:
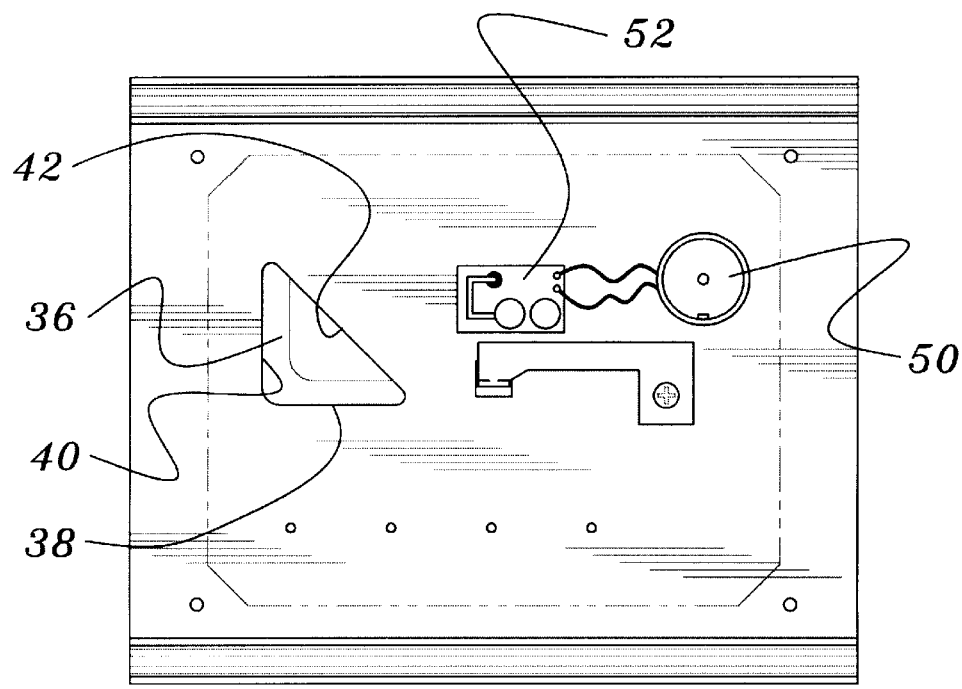
FIG. 6 is a bottom view of embodiment of the present invention shown in FIG. 5.
Figure 7:
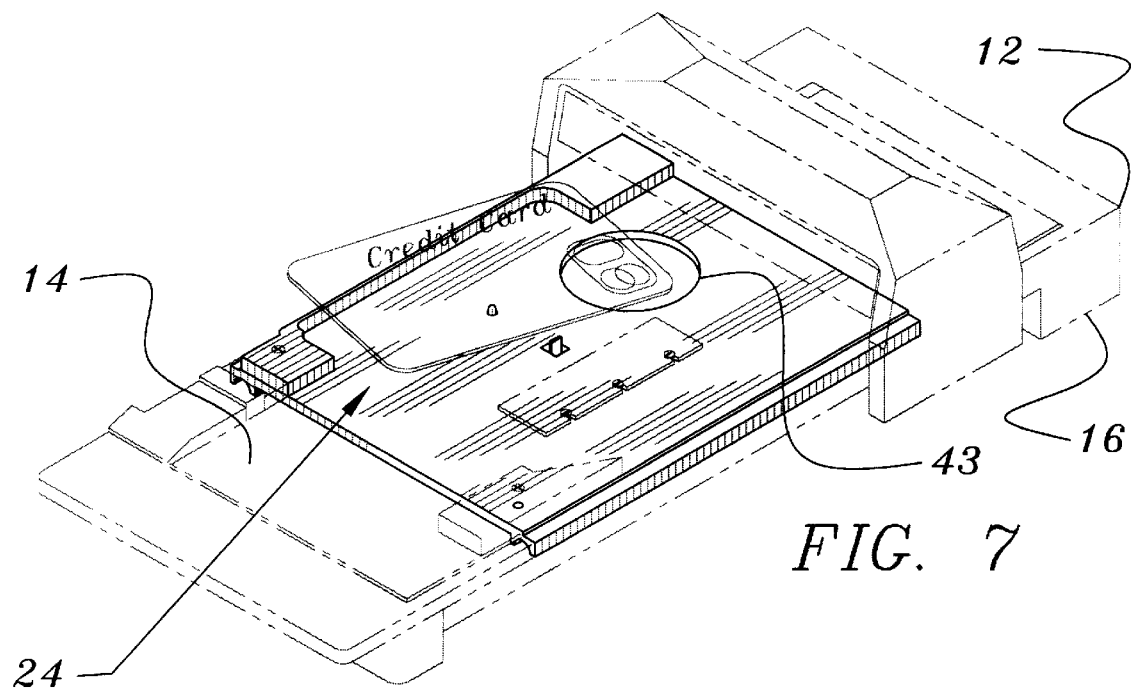
FIG. 7 is a perspective view of another alternate embodiment of the present invention wherein the opening is formed with a circular shape.
Figure 8:
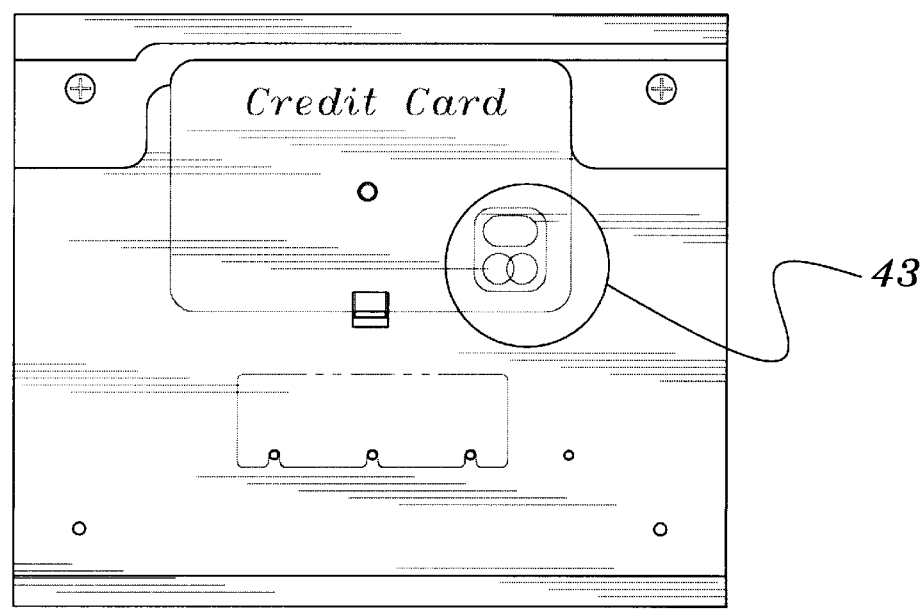
FIG. 8 is a top view of the embodiment of the present invention shown in FIG. 7.
Figure 9:
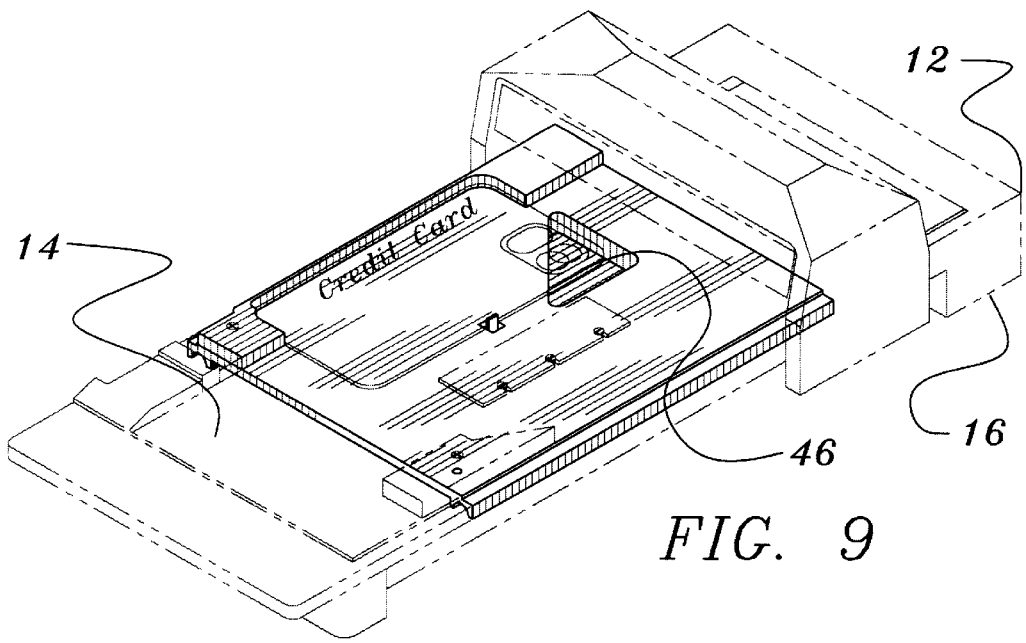
FIG. 9 is a perspective view of yet another alternate embodiment wherein the opening includes a recess.
Figure 10:
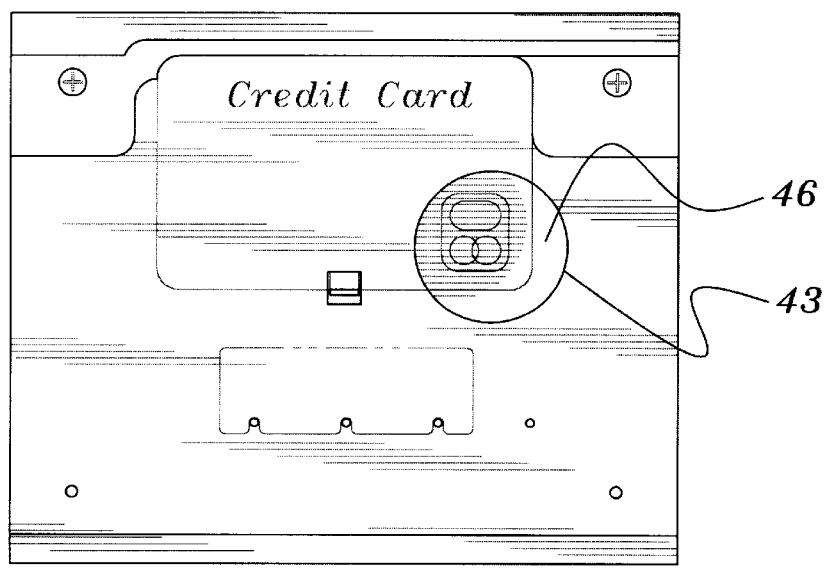
FIG. 10 is a top view of the alternate embodiment shown in FIG. 9.

As shown in FIGS. 7 and 8, the opening may take the form of a circle 43 in an alternate embodiment. Other shapes such as rectangles, squares, and the like may also be employed. Further, it should be understood that the opening may take the form of a recess 46 formed in the top surface of the base plate, as shown in FIGS. 9 and 10. In the alternative, the opening may be formed entirely through the top and bottom surface of the base plate, thereby defining apertures. Note FIGS. 1–8.

Figure 4:
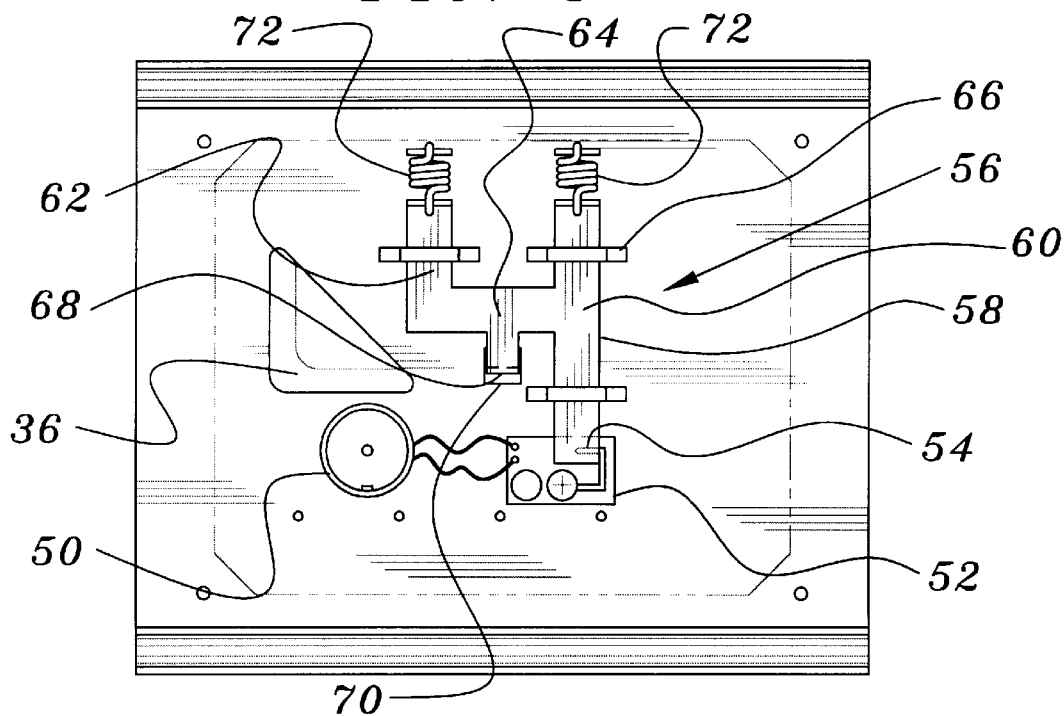
FIG. 4 is a bottom view of the present invention depicting the trigger assembly.
Figure 5:
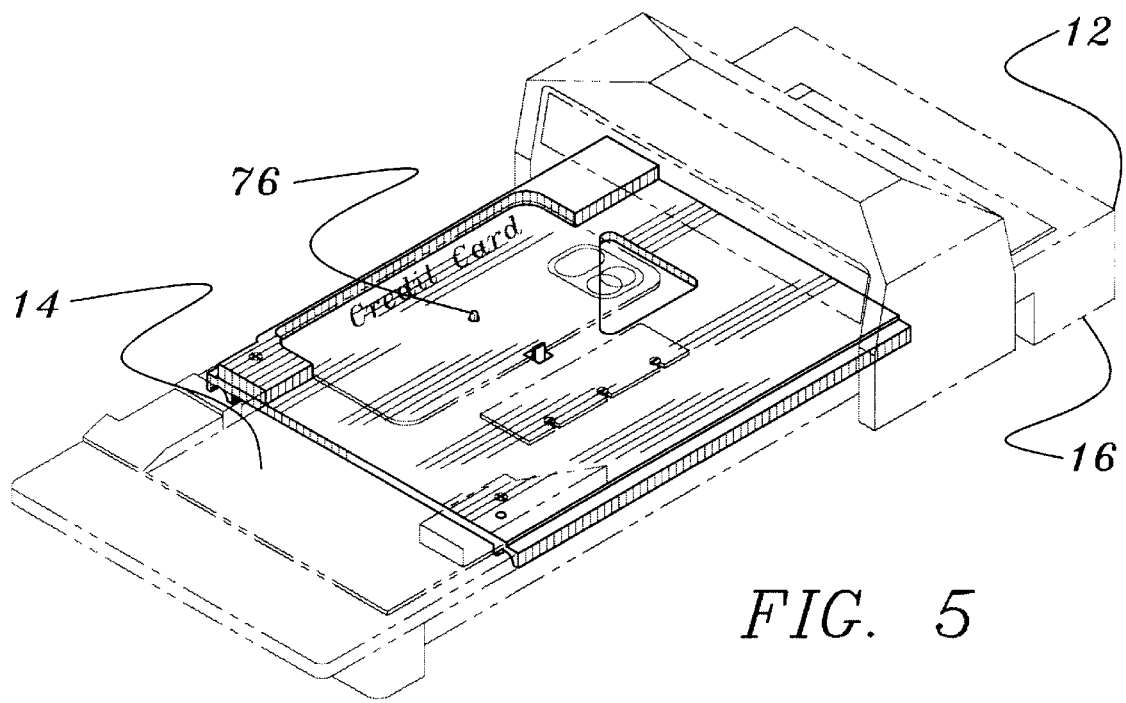
FIG. 5 is a perspective view of an alternate embodiment of the present invention.

With reference now to FIG. 4, it can be seen that a piezoelectric sound emitting means 50 is mounted on the bottom surface of the base plate of the credit card machine. Such sound emitting means is adapted for audibly emitting audio signals upon the receipt thereof. In the alternative, a magnetic coil speaker may be employed in combination with an amplifier. Connected to the piezoelectric sound emitting means is audio signal producing means 52. The audio signal producing means preferably comprises a small circuit similar to that utilized in the art of greeting cards. The audio signal producing means is adapted for continuously producing audio signals and transmitting the same to the piezoelectric sound emitting means only during the receipt of power. Such audio signals ideally comprise a musical tune. A switch means 54 is connected between the audio signal producing means and a watch battery for providing power to the audio signal producing means only upon the closing thereof. While not shown, in the preferred embodiment, the switch means includes a flexible metallic contact that may be biased to abut another metallic contact.

With continuing reference to FIG. 4, a trigger assembly 56 is provided for closing the switch means only when the credit card is situated within the rectangular groove of the credit card mounting assembly. The trigger assembly includes a slider 58 with a h-shaped configuration defined by a linear long extent 60, a linear short extent 62, and an intermediate extent 64. Such intermediate extent is integrally coupled between a first end of the short linear extent and a central portion of the long linear extent. It should be noted that the long, short and intermediate extents reside in a common plane.

For maintaining the slider in slidable abutment with the bottom surface of the base plate, the trigger assembly further includes a plurality of U-shaped sliding brackets 66 mounted on the bottom surface of the base plate. Such U-shaped brackets slidably receive the short linear extent and the long linear extent. Preferably, three brackets are provided including one bracket connected to the short linear extent and a pair of brackets connected to the long extent of the slider.

As shown in FIG. 4, the intermediate extent has a tab 68 integrally coupled to a top surface thereof. This tab is extended upwardly from the slider through a square aperture 70 formed in the base plate between a central extent of the strip portion of the mounting assembly and the rectangular member of the base plate of the credit card machine.

The trigger assembly further includes a pair of springs 72. Such springs include a first spring coupled between a second end of the linear short extent and the bottom surface of the base plate. A second spring is connected between a first end of the linear long extent and the bottom surface of the base plate. The slider is thus adapted to slide between an unbiased first orientation wherein the tab abuts a first side edge of the square aperture and a second end of the long linear extent of the slider is situated distant the switch means. The slider is further adapted to slide to a biased second orientation wherein the tab abuts a second side edge of the aperture and the second end of the long linear extent of the slider abuts the switch means thereby closing the same. Ideally, the second end of the long linear extent is bevelled to engage and bias the flexible metallic contact of the switch means. It should be understood that upon the placement of the credit card within the rectangular groove of the credit card mounting assembly, a bottom edge thereof abuts the tab of the trigger assembly thereby transferring the tab to the second orientation thereof. In the second orientation, the present invention thus effects the emission of audio signals from the piezoelectric sound emitting means for reminding a user to remove the credit card.

It is now apparent that by the abutment of the tab with the credit card, the removal of the same is impeded thus rendering the inclusion of the opening critical to the operation of the triggering assembly. In the alternative, as shown in FIGS. 5–8, a simple vertically oriented micro-push button switch 76 may be positioned within a bore formed in the base plate adjacent the rectangular groove. Such push button switch functions as both the switch means and the trigger assembly in that it provides power to the audio signal producing means upon the depression thereof. As shown in FIG. 6, the tab 68 is fixed within the square aperture of the present embodiment.

The present invention thus relates to an improved design of the existing hand operated credit card machine which registers embossed credit cards. When the flat credit card is placed on the flat base plate of the machine, it is difficult to remove or lift the card from the flat surface. This improved design is a cut through the opening of a recessed section on the lower right portion where the card sets flat. The opening or recessed section should be located so that the card extends over the aperture or the recessed section for either allowing a user to press the card down and pop the card up or to place a finger between the opening and the edge of the card and lift the card up. The present invention thus makes picking up the card much easier and eliminates the problem of nail breaking and the nuisance of trying to lift the card up.

The present invention further provides an audio reminder that a card is in the manually operated credit card. The present invention aids businesses by reminding the operator of the manual credit card machine to remove the card and return it to the customer and, aids customers who use a credit card by audibly signalling that the card has been left in the machine and not yet returned.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for reminding a user to remove a credit card from a credit card machine comprising, in combination:

a manually operated credit card machine including a generally planar base plate with a rectangular configuration having a top surface, a bottom surface, and a periphery defined by a pair of long side edges and a pair of short end edges, the bottom surface of the base plate having a pair of rectangular blocks integrally coupled thereto along the end edges for elevating the base plate from a supporting surface, the top surface of the base plate having a credit card mounting assembly including an elongated thin strip portion positioned along one of the side edges of the base plate with a pair of square portions situated at ends of the strip portion, the strip portion and the square portions of the mounting assembly having a predetermined height, wherein the mounting assembly defines a rectangular groove sized to preclude movement of a credit card when situated therein, the base plate further including a rectangular member with the predetermined height coupled to the top surface of the base plate such that a long side edge thereof is spaced from and parallel with the strip portion of the mounting assembly;

a sliding assembly including an upper bar having a top face, a bottom face and a periphery formed therebetween, the top face having a frusto-pyramidal configuration, the sliding assembly further including a pair of planar side faces coupled along an upper edge thereof to the bottom face of the upper bar and extending downwardly therefrom, the side faces slidably coupled to the long edges of the base plate of the credit card machine such that the upper bar remains perpendicular with respect to the long edges and is further adapted to be manually translated between the end edges of the base plate, whereby upon the placement of a credit card within the rectangular groove and a credit card register form on the top surface of the base plate, the sliding assembly may be slid from a first end edge of the base plate to a second end edge thereof thereby imprinting information embossed on the credit card on the credit card register form;

a triangular opening formed in the base plate, the triangular opening having a first linear edge parallel with and spaced in relation to the strip portion of the credit card mounting assembly, a second linear edge defining a right angle with the first linear edge and parallel with and spaced in relation to an edge of one of the square portions of the credit card mounting assembly, and a third linear edge formed between ends of the first and second linear edges, whereby the credit card may be removed by the depression of a corner thereof which resides over the opening;

piezoelectric sound emitting means mounted on the bottom surface of the base plate of the credit card machine for audibly emitting audio signals upon the receipt thereof;

audio signal producing means connected to the piezoelectric sound emitting means and adapted for continuously producing audio signals and transmitting the same to the piezoelectric sound emitting means only during the receipt of power;

switch means connected between the audio signal producing means and a watch battery for providing power to the audio signal producing means upon the closing thereof; and a trigger assembly for closing the switch means only when the credit card is situated within the rectangular groove of the credit card mounting assembly, the trigger assembly including a slider with a h-shaped configuration defined by a linear long extent, a linear short extent, and an intermediate extent integrally coupled between a first end of the short linear extent and a central portion of the long linear extent with the long, short and intermediate extents residing in a common plane, the trigger assembly further including a plurality of U-shaped sliding brackets mounted on the bottom surface of the base plate and slidably receiving the short linear extent and the long linear extent such that the slider is in slidable abutment with the bottom surface of the base plate, the intermediate extent having a tab integrally coupled to a top surface thereof and extending upwardly therefrom through a square aperture formed in the base plate between a central extent of the strip portion of the mounting assembly and the rectangular member of the base plate of the credit card machine, the trigger assembly further including a pair of springs including a first spring coupled between a second end of the linear short extent and the bottom surface of the base plate and a second spring connected between a first end of the linear long extent and the bottom surface of the base plate, the slider thus adapted to slide between an unbiased first orientation wherein the tab abuts a first side edge of the square aperture and a second end of the long linear extent of the slider situated distant the switch means and a biased second orientation wherein the tab abuts a second side edge of the aperture and the second end of the long linear extent of the slider abuts the switch means thereby closing the same, thus effecting the emission of audio signals from the piezoelectric sound emitting means for reminding a user to remove the credit card, whereby upon the placement of the credit card within the rectangular groove of the credit card mounting assembly, a bottom edge thereof abuts the tab of the trigger assembly.

2. A system for reminding a user to remove a credit card from a credit card machine comprising:

a credit card machine for recording information stored on a credit card;

means for producing sound upon the actuation thereof; and a trigger assembly connected to the credit card machine for actuating the means for producing sound when the information of the credit card is read.

3. A system for reminding a user to remove a credit card from a credit card machine as set forth in claim 2 wherein the credit card includes a sliding assembly slidably mounted to the credit card machine for manually recording information from the credit card.

4. A system for reminding a user to remove a credit card from a credit card machine as set forth in claim 3 wherein the credit card machine includes a base plate and mounting assembly coupled thereto which defines a rectangular groove sized to preclude movement of a credit card when situated therein.

5. A system for reminding a user to remove a credit card from a credit card machine as set forth in claim 4 and further including an opening formed in the base plate for allowing the credit card to be removed by the depression of a corner thereof which resides over the opening.

6. A system for reminding a user to remove a credit card from a credit card machine as set forth in claim 5 wherein the opening in circular.

7. A system for reminding a user to remove a credit card from a credit card machine as set forth in claim 5 wherein the opening is triangular.

8. A system for reminding a user to remove a credit card from a credit card machine as set forth in claim 2 wherein the last mentioned means includes a piezoelectric sound emitting means.

9. A system for reminding a user to remove a credit card from a credit card machine as set forth in claim 4 wherein the last mentioned means comprises:

sound emitting means mounted on the bottom surface of the base plate of the credit card machine for audibly emitting audio signals upon the receipt thereof;

audio signal producing means connected to the sound emitting means and adapted for continuously producing audio signals and transmitting the same to the sound emitting means only during the receipt of power; and switch means connected between the audio signal producing means and a battery for providing power to the audio signal producing means upon the closing thereof;

wherein the trigger assembly is adapted for closing the switch means only when the credit card is situated within the rectangular groove of the credit card mounting assembly.

10. A system for reminding a user to remove a credit card from a credit card machine as set forth in claim 4 wherein the trigger assembly includes a vertically oriented push button situated within a bore formed in the base plate.

11. A system for reminding a user to remove a credit card from a credit card machine as set forth in claim 4 wherein the trigger assembly includes a switch adapted to abut a periphery of the credit card machine.

12. A system for reminding a user to remove a credit card from a credit card machine as set forth in claim 11 wherein the trigger assembly includes a slider slidably mounted to a bottom surface of the base plate with a tab extending upwardly therefrom through an aperture formed in the base plate.

13. A system for reminding a user to remove a credit card from a credit card machine as set forth in claim 12 wherein the slider is mounted to the bottom surface of the assembly via a plurality of U-shaped brackets.

14. A system for reminding a user to remove a credit card from a credit card machine as set forth in claim 12 wherein at least one spring is coupled to the slider for maintaining the slider in an unbiased orientation.

15. A system for facilitating the removal of a credit card from a credit card machine comprising:

a credit card machine for recording information stored on a credit card, the credit card including a sliding assembly slidably mounted to the credit card machine for manually recording information from the credit card and a base plate and mounting assembly coupled thereto which defines a rectangular groove sized to preclude movement of a credit card when situated therein; and an opening formed in the base plate for allowing the credit card to be removed by the depression of a portion thereof which resides over the opening.

16. A system as set forth in claim 15 wherein the opening takes the form of a recess.

17. A system as set forth in claim 15 wherein the opening extends between a top and bottom surface of the base plate.

18. A system as set forth in claim 15 wherein the opening in circular.

19. A system as set forth in claim 15 wherein the opening is triangular.

* * * * *